May 9, 1950 J. K. HELLER 2,507,104
MULTIPLE SAFETY VALVE MANIFOLD
Filed Nov. 22, 1948 2 Sheets-Sheet 1
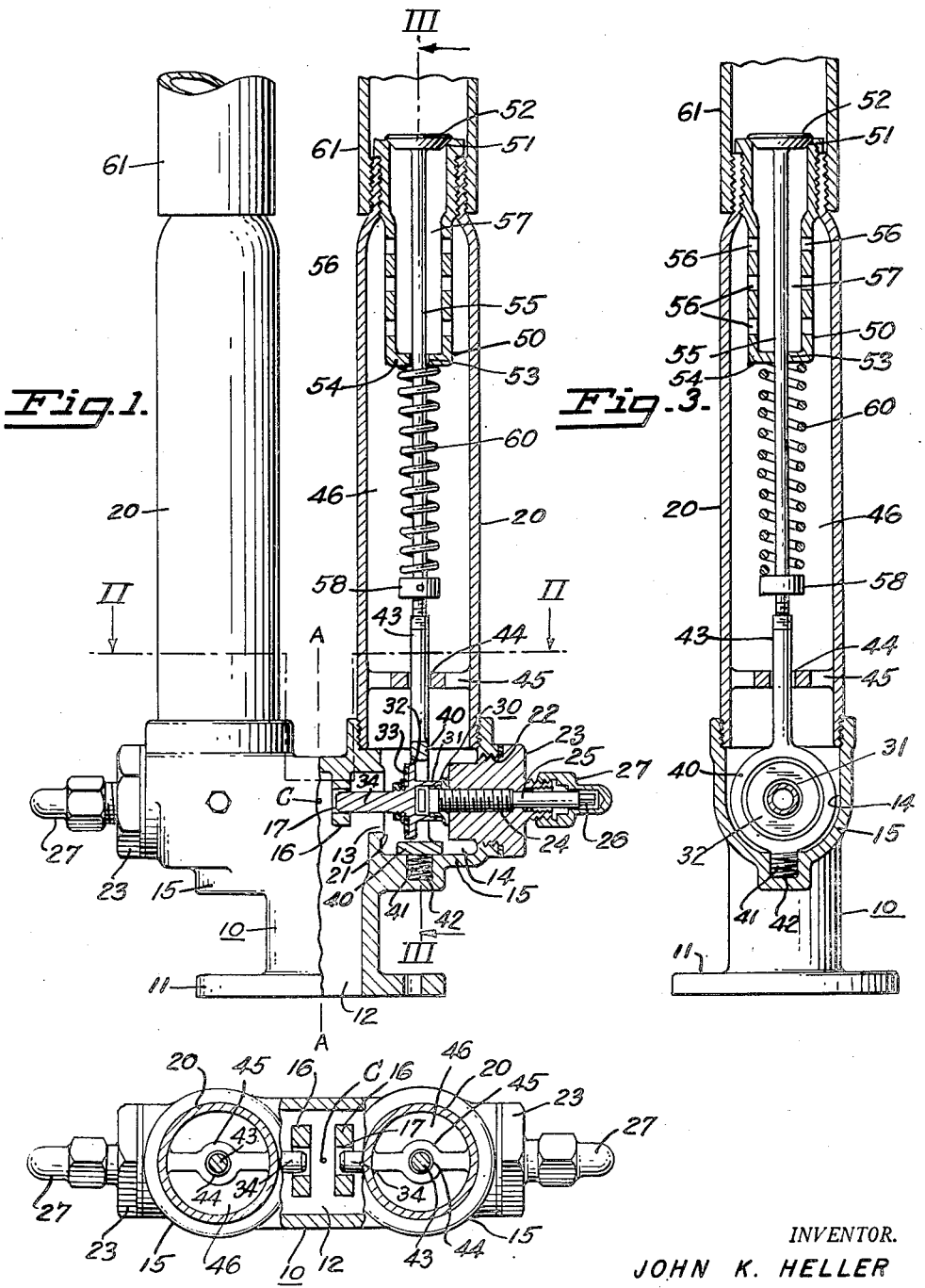
Fig.1.
Fig.2.
Fig.3.
INVENTOR.
JOHN K. HELLER
BY 
ATTORNEY

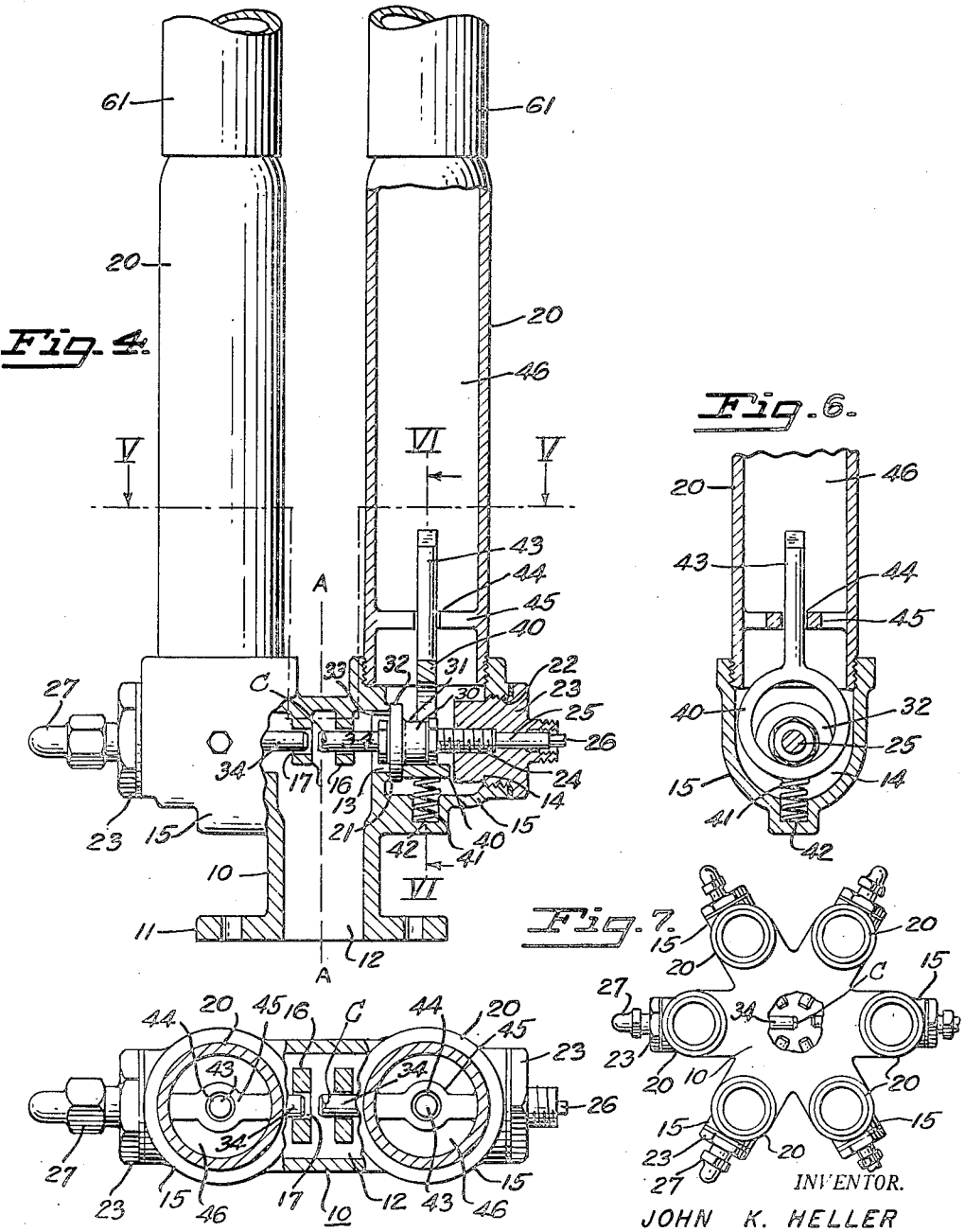
May 9, 1950  J. K. HELLER  2,507,104
MULTIPLE SAFETY VALVE MANIFOLD
Filed Nov. 22, 1948  2 Sheets-Sheet 2
INVENTOR.
JOHN K. HELLER
BY
ATTORNEY Patented May 9, 1950

2,507,104

UNITED STATES PATENT OFFICE 2,507,104

MULTIPLE SAFETY VALVE MANIFOLD

John K. Heller, San Francisco, Calif., assignor to Gasair Corporation, San Francisco, Calif., a corporation of California Application November 22, 1948, Serial No. 61,490

3 Claims. (Cl. 277—26)

This invention relates to a multiple safety valve manifold and has particular reference to a type of manifold having a plurality of safety valves, with interlock means arranged so that only one of its safety valves at a time may be closed off. The invention has still more particular reference to a construction by which, when any one of the safety valves is closed off from the manifold, it cannot conveniently be reconnected unless its safety mechanism is in place again.

It is contemplated that this invention will be especially useful as a safety device for tanks of compressed inflammable gases. In spite of the fact that safety is of paramount importance with such gases, many operators are careless. Heedless of the possibilities of explosions, they sometimes shut off defective safety valves rather than go to the trouble of replacing them. In order to prevent this sort of careless tampering it has been the practice to combine several valves in a manifold so that they form an interrelated group in which at least one valve remains open to the manifold at all times. Yet the operators sometimes close off a valve, remove its safety mechanism, plug the valve and reopen the passage from the manifold to the plugged valve, so that they are eventually able to close off or plug all of the valves. Explosions have sometimes resulted from this careless procedure. These explosions would not have occurred had it been easy to replace the safety mechanism and difficult to nullify the valve, because the operator would have taken the easy course and replaced the safety valve.

The problem has been how to provide a foolproof safety manifold, that is, one in which it is far easier to replace a defective safety valve than to nullify it. Stated another way, the problem has been how to provide a safety installation for gases under pressure which is extremely difficult to operate unless easily replaceable safety equipment is in position.

One object of the invention is to provide an improved safety installation for use with gases under pressure.

Another object of the invention is to provide a safety installation in which it is practically impossible to shut off more than one of a plurality of safety mechanisms at any one time.

Another object of the invention is to provide a foolproof, tamperproof, multiple safety valve manifold in which the passage to at least one safety valve remains open to the manifold pressure at all times.

Another object of the invention is to provide a multiple safety valve manifold in which once the passage to a valve is closed it cannot be reopened unless the safety mechanism is in place.

A further object of the invention is to provide a multiple safety valve manifold capable of use with any number of safety valves.

A further object of the invention is to provide a multiple safety valve manifold having a structure such that it is much easier to replace a defective safety valve than to tamper with the manifold so as to close off all its safety valves.

Another object of the invention is to provide a substantially tamper-proof safety installation, for gases under pressure, of a construction which is easy to repair correctly but difficult to tamper with so as to nullify the safety features.

Other objects and advantages of the invention will appear from the following description of a particular embodiment. In accordance with U. S. Revised Statutes, Sec. 4888, the device is illustrated and described in detail, but it is to be understood that changes may be made in size, material, location, and kinds of parts, and still leave the device within the spirit of the invention, as defined by the claims.

In the drawings:

Fig. 1 is a view in front elevation of a multiple safety valve manifold embodying the principles of the invention; half of the manifold and one of its two safety valves are shown in section, each of the passages between the manifold and its valves being open;

Fig. 2 is a view in section along the line II—II in Fig. 1;

Fig. 3 is a view in side elevation and in section along the line III—III in Fig. 1;

Fig. 4 is a view similar to Fig. 1, but showing one of the valves closed off from the manifold and with the safety mechanism withdrawn;

Fig. 5 is a view in section along the line V—V in Fig. 4;

Fig. 6 is a view in section along the line VI—VI in Fig. 4; and

Fig. 7 is a plan view, partly in section, of a modified form of manifold in which six safety valves are employed instead of two.

In general the invention comprises a multiple safety valve manifold in which the manual valves have forwardly projecting valve stems radially directed toward a common point; and in which a valve can be closed off from the manifold only when its stem crosses the common point. Since only one stem at a time can cross the common point, it will be evident that only one valve at a time may be closed off. In each valve a means is also provided to prevent an advanced stem from being retracted unless the safety mechanism of its valve is in place.

The manifold illustrated in Figs. 1 to 6 employs two safety valves, but more may be used; for example, a manifold employing six valves is illustrated in Fig. 7. In any case only one safety valve may be closed off at a time.

The manifold housing 10 is provided with a flanged base 11 which fits on the pressure tank or line (not shown) so that the manifold bore 12 communicates with the interior of the tank or line. In the upper portion of the manifold 10 are a plurality of ports 13, each of which opens into the hollow interior 14 of a safety valve rest 15. All the ports 13 are at substantially the same level and they face toward a common center point C on the axis A—A of the housing 10. Guide members 16, which depend from the inside upper wall of the housing 10, are bored to provide guide channels 17, each of which is in line with the common center C and the center of one of the ports 13. The number of ports 13, valve rests 15, and guide members 16, may vary according to the number of safety valves desired. The form of the invention shown in Figs. 1 through 6 has two of each, while the modification shown in Fig. 7 has six. In any event the principles remain the same.

The valve rests 15 may be integral with the housing 10 or may be separate pieces secured to it. Each rest 15 supports a safety valve housing 20 and includes valve closing means for shutting off the port 13.

The valve closing means includes a seat 21 around the valve-rest side of the port 13. Directly opposite the seat 21, a threaded opening 22 in the valve rest 15 is closed by a bonnet 23. The bonnet has a threaded central bore 24 axially aligned with the center of the port 13 and the guide channels 17. Into the opening 24 is threaded a valve stem 25. The keyed end 26 of the stem 25 projects outside the bonnet 23, and a seal cap 27 is threaded on the tapered end of the bonnet 23 to protect against accidental movement of the stem 25. When it is desired to close the valve, the seal cap 27 is removed (as in Fig. 4) and a wrench placed on the keyed end 26.

The interior end of the stem 25 is threaded into a valve member 30. The member 30 comprises a collar 31, a flange 32 in front of the collar 31, having a forward face 33, and a stem 34 which projects close to or somewhat beyond the common center C. Thus only one of the valves 20 may be shut off from the manifold 10 at any one time.

To prevent tampering a ring or detent 40 is disposed around the member 30 to prevent its retraction, once it has been closed, unless the safety mechanism is installed. A spring 41, positioned in a recess 42 in the lower interior wall of the rest 15, urges the detent or ring 40 upwardly. The ring 40 has a vertically extending guide stem 43 at its top which fits through a central opening 44 in a web or spider 45 inside the valve housing 20. The web 45 aligns the stem 43 and ring 40 while permitting the passage of gas through the valve interior 46 of the housing 20 (see Figs. 2 and 5).

When the valve is open, the detent 40 rests adjacent the outer rim of the flange 32 (see Fig. 1), but when the valve is closed (see Fig. 4), the detent 40 is urged by the spring 41 up behind the flange 32 and against the collar 31, unless (as will be explained presently) the safety valve is in position. When the detent 40 is in the position shown in Figs. 4 and 6, the valve member 30 cannot be retracted, and the stem 34 cannot be drawn back away from the common center C. Moreover, since there is very little clearance between the detent 40 and the inner portion of the bonnet 23, the detent 40 cannot be tinkered with to avoid this result. Therefore, no other safety valve may be closed off from the manifold.

A preferred type of easily replaceable safety valve for use with the manifold 10 is shown in Figs. 1 and 3. A valve body member 50 is threaded into the upper end of the housing 20. The upper end 51 of the member 50 serves as the seat for a closure member 52, and an opening 53 in the lower end 54 of the body 50 serves to guide the long vertical stem 55. The wall of the body 50 is perforated by holes 56 to permit free passage of gas from the housing bore 46 into the interior bore 57 of the valve body. A collar 58 adjacent the lower end of the stem 55 serves to confine the lower end of a spring 60 and the upper end of the spring abuts the bottom wall 54 of the member 50. The spring 60 holds the valve 51, 52 closed until a predetermined critical value is reached; then the member 52 is unseated from the seat 51 by the pressure of the gas against it, and the gas passes off into the safety tube 61, threaded around the upper end of the housing 20.

In operation, the lower end of the stem 55 rests on the upper end of the ring stem 43, and the parts are so proportioned that when the safety valve is closed, the detent 40 is depressed out of engagement with the port valve closure member 30. The force of the spring 60 helps hold the detent in this non-operative position. However, when the safety valve is opened and the stem 55 is moved upwardly, the detent 40 is urged up against the flange 32, and if the face 33 is moved against the seat 21, the detent 40 will clear the flange 32 and move up behind it. When the safety valve closes again, the detent 40 is moved down and the valve member 30 may be retracted and opened again. If, however, the safety valve is removed, the detent prevents retraction of the member 30. Since only one valve at a time can be closed off, the detent serves to prevent closure of any other valve until the safety mechanism is in place in the closed valve and the valve opened.

The safety valve is easily removed by first closing the lower valve and then unthreading the pipe 61 from the housing 20 and unscrewing the valve body 50. The body 50 and the stem 55 may then be removed together, and a new safety valve installed. This ease of replacement contrasts with the difficulty of improvising means to hold the detent 40 in inoperative position and at the same time plugging the hole. Because of this contrast, even a lazy operator has every inducement to replace the safety valve instead of trying to improvise a way to plug the valve.

I claim:

1. A multiple safety valve manifold comprising a housing having a plurality of ports; a corresponding plurality of safety valves mounted on said housing around a common center, each valve communicating with the interior of said housing through one port; a port closing member in each valve having a stem projecting forwardly thereof so as to project beyond said common center when said member closes the port, whereby only one of said ports may be closed at any one time; locking means for preventing a stem which has been moved past said common center from being retracted enough to permit closure of another port; and unlocking means in said safety valve opposing said locking means and permitting retraction of the stem.

2. The manifold claimed in claim 1 in which the locking means preventing retraction of said stem comprises a detent, means to urge said detent behind said port closing member when said port is closed, and in which the unlocking means includes means to normally oppose said urging means and hold said detent so that said stem can be retracted.

3. A multiple safety valve manifold for gases under pressure, comprising a manifold housing having a plurality of ports facing toward a common center; a plurality of safety valve housings each communicating with the interior of said housing through a said port; a closure member in each said safety valve housing having an enlarged face portion adapted to close one of said ports; a stem projecting from each said closure member toward said common center, said face being adapted to close said port only when its said stem projects beyond said common center; a detent positioned in each said safety valve housing on the opposite side of said enlarged face portion from said projecting stem; means for urging each said detent toward the axial line of said closure member, said detent and said closure member being so proportioned that said detent clears said enlarged face portion when said face is closed against said port; a safety valve in each said safety valve housing comprising a seat, a safety closure member and means to hold said safety closure member against said seat until a predetermined pressure is reached inside said valve housing which opens said safety closure member from said seat; and a stem on said safety valve closure member which opposes said detent urging means and holds said detent out of its locking position behind said face portion while said safety valve is closed.

JOHN K. HELLER.

REFERENCES CITED

The following references are of record in the file of this patent:

UNITED STATES PATENTS

| Number | Name | Date |
|---|---|---|
| 2,207,491 | Parker | July 9, 1940 |
| 2,298,233 | Ricard | Oct. 6, 1942 |